(12) United States Patent
Borglum

(10) Patent No.: US 6,217,822 B1
(45) Date of Patent: Apr. 17, 2001

(54) METHOD OF MAKING STRAIGHT FUEL CELL TUBES

(75) Inventor: Brian P. Borglum, Edgewood, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/021,054

(22) Filed: Feb. 9, 1998

(51) Int. Cl.$^7$ ............................... B29B 15/00; B28B 3/20
(52) U.S. Cl. .............................. 264/632; 264/232
(58) Field of Search .................. 264/671, 234, 264/632, 634, 232

(56) References Cited

U.S. PATENT DOCUMENTS

| | | |
|---|---|---|
| 4,431,715 | 2/1984 | Isenberg . |
| 4,490,444 | 12/1984 | Isenberg . |
| 4,562,124 | 12/1985 | Ruka . |
| 4,631,238 | 12/1986 | Ruka . |
| 4,748,091 | 5/1988 | Isenberg . |
| 4,791,035 | 12/1988 | Reichner . |
| 4,833,045 | 5/1989 | Pollack et al. . |
| 4,874,678 | 10/1989 | Reichner . |
| 4,876,163 | 10/1989 | Reichner . |
| 5,108,850 | 4/1992 | Carlson et al. . |
| 5,227,105 | 7/1993 | Eucker et al. . |
| 5,258,240 | 11/1993 | Di Croce et al. . |
| 5,273,838 | 12/1993 | Draper et al. . |
| 5,911,941 | * 6/1999 | Rokhvarger et al. ............... 264/432 |

OTHER PUBLICATIONS

Principles of Ceramics Processing by Reed, John Wiley & Sons, Inc., 1995.*

* cited by examiner

Primary Examiner—Christopher A. Fiorilla
(74) Attorney, Agent, or Firm—Eckert Seamans Cherin & Mellott, LLC

(57) ABSTRACT

A method and an apparatus for making straight fuel cell tubes are disclosed. Extruded tubes comprising powders of fuel cell material and a solvent are dried by rotating the extruded tubes. The rotation process provides uniform circumferential drying which results in uniform linear shrinkage of the tubes. The resultant dried tubes are very straight, thereby eliminating subsequent straightening steps required with conventional processes. The method is particularly useful for forming inner air electrode tubes of solid oxide fuel cells.

26 Claims, 2 Drawing Sheets

US 6,217,822 B1

METHOD OF MAKING STRAIGHT FUEL CELL TUBES

GOVERNMENT CONTRACT

This invention was made with Government support under Contract No. DE-FC21-91MC28055 awarded by the United States Department of Energy. The United States Government has certain rights in this invention.

FIELD OF THE INVENTION

The present invention relates to fuel cells, and more particularly relates to a method of making straight tubes for solid oxide fuel cells.

BACKGROUND INFORMATION

Fuel cells are among the most efficient of power generation devices. One type of solid oxide fuel cell (SOFC) generator has a projected 70 percent net efficiency when used in an integrated SOFC-combustion turbine power system in which the turbine combustor is replaced by a SOFC.

Several different fuel cell designs are known. For example, one type of solid oxide fuel cell consists of an inner porous doped-lanthanum manganite tube having an open end and a closed end, which serves as the support structure for the individual cell, and is also the cathode or air electrode of the cell. A thin gas-tight yttria-stabilized zirconia electrolyte covers the air electrode except for a relatively thin strip of an interconnection surface, which is a dense gas-tight layer of doped-lanthanum chromite. This strip serves as the electric contacting area to an adjacent cell or, alternatively, to a power contact. A porous nickel-zirconia cermet layer, which is the anode or fuel electrode, covers the electrolyte, but not the interconnection strip.

Exemplary fuel cells are disclosed in U.S. Pat. No. 4,431,715 to Isenberg, U.S. Pat. No. 4,490,444 to Isenberg, U.S. Pat. No. 4,562,124 to Ruka, U.S. Pat. No. 4,631,138 to Ruka, U.S. Pat. No. 4,748,091 to Isenberg, U.S. Pat. No. 4,791,035 to Reichner, U.S. Pat. No. 4,833,045 to Pollack, et al., U.S. Pat. No. 4,874,678 to Reichner, U.S. Pat. No. 4,876,163 to Reichner, U.S. Pat. No. 5,108,850 to Carlson et al., U.S. Pat. No. 5,258,240 to Di Croce et al., and U.S. Pat. No. 5,273,838 to Draper et al., each of which is incorporated herein by reference.

The air electrode tubes used for solid oxide fuel cells are required to be very straight, for example, with a maximum allowable bow of 2.0 mm over a length of 1.81 m. The process used to make a finished tube consists of several steps. First, organic binders, inorganic powder and water are mixed under high shear to form a paste with suitable rheological properties. This mix is then extruded through a die under high pressure to form the tubular shape of desired cross-sectional geometry. As the tube dries, it becomes rigid such that it can be handled. Conventional air electrode tubes undergo two heating steps. The extruded tubes are first heated horizontally to burn off the organic binders and to develop handling strength. The tubes are then fired to their desired density while hanging vertically.

The primary obstacle in fabricating straight tubes is forming straight green tubes composed of organic binders and the air electrode material. The straightness of the tube prior to sintering dictates in large part the resultant straightness of the sintered tube. In the past, tubes have been extruded onto V-shaped racks and dried in a controlled temperature/humidity chamber. This has been done in an effort to moderate and control the drying rate of the tube such that it would not become bowed. However, this process has been only marginally successful, and the tubes are often severely bowed. If a dried tube is bowed, vertical sintering is conventionally required in order to straighten the air electrode tube in order to correct the problem. At typical air electrode sintering temperatures of 1,500–1,600° C., high temperature creep and gravity work together to straighten the once bowed tube to within allowable limits. However, vertical sintering adds another processing step and does not consistently result in the formation of tubes within the desired straightness tolerance. Accordingly, it would be advantageous to form dried air electrode tubes of sufficient straightness such that subsequent straightening processes are not required.

The present invention has been developed in view of the foregoing, and to address other deficiencies of the prior art.

SUMMARY OF THE INVENTION

The present method involves continuously rotating an extruded fuel cell tube while it dries in order to provide circumferential drying and uniform linear shrinkage. The resultant ceramic tube is of superior straightness compared to tubes dried by methods used in the past. Additionally, a subsequent straightening step and its associated equipment may be removed from the manufacturing process. The present process produces a ceramic tube that is compatible with one step horizontal sintering, which may further reduce the cost of air electrode tubes.

The method of the present invention increases the manufacturing yield of air electrode tubes, decreases the capital investment required for equipment, decreases the manufacturing cycle time, and increases the throughput of a manufacturing facility, thereby reducing the cost of producing solid oxide fuel cells for SOFC generators.

An object of the present invention is to provide a method of drying a fuel cell tube. The method includes the steps of forming a tube from a mixture comprising ceramic fuel cell powder and a solvent, and rotating the formed tube about its axis to remove the solvent from the tube to thereby form a dried fuel cell tube.

Another object of the present invention is to provide an apparatus for drying a fuel cell tube. The apparatus includes means for rotating a formed fuel cell tube about its axis to remove solvent from the formed tube as it rotates.

These and other objects of the present invention will be more apparent from the following description.

DESCRIPTION OF THE PREFERRED EMBODIMENTS

In accordance with the present invention an extruded fuel cell tube is dried in such a manner that it is very straight. As used herein, the term "fuel cell tube" means a formed fuel cell component which may be used to make a fuel cell. For example, a typical fuel cell tube may include a generally cylindrical air electrode or fuel electrode of a solid oxide fuel cell.

Figure 1:
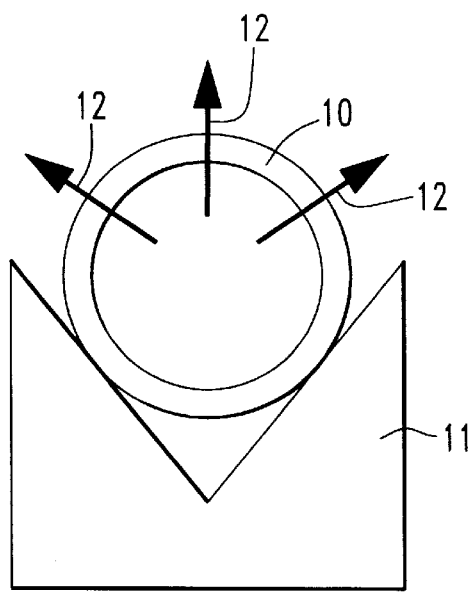
FIG. 1 is a partially schematic end view illustrating a conventional process for drying an extruded fuel cell tube.
Figure 2:
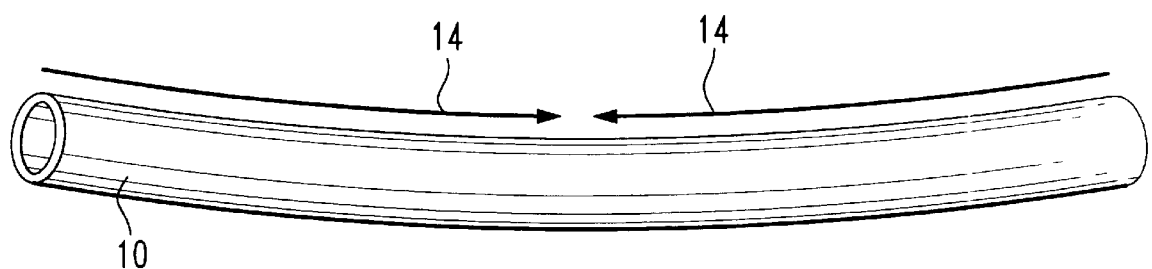
FIG. 2 is an elevational view of a fuel cell tube dried by conventional methods having substantial curvature resulting from non-uniform shrinkage.

In the past, as-extruded fuel cell tubes were dried in a controlled temperature/humidity chamber in an effort to moderate and control the drying rate to prevent the tubes from becoming bowed. However, it has been found that a primary cause of tube bowing is non-uniform drying. As shown schematically in FIG. 1, when an extruded tube 10 remains stationary on a conventional V-shaped drying rack 11, preferential drying occurs on the top portion of the tube, as shown by arrows 12. This gives rise to a linear shrinkage that is larger on the top of the tube than on the supported side, and results in tube bow as shown by the arrows 14 in FIG. 2.

Figure 3:
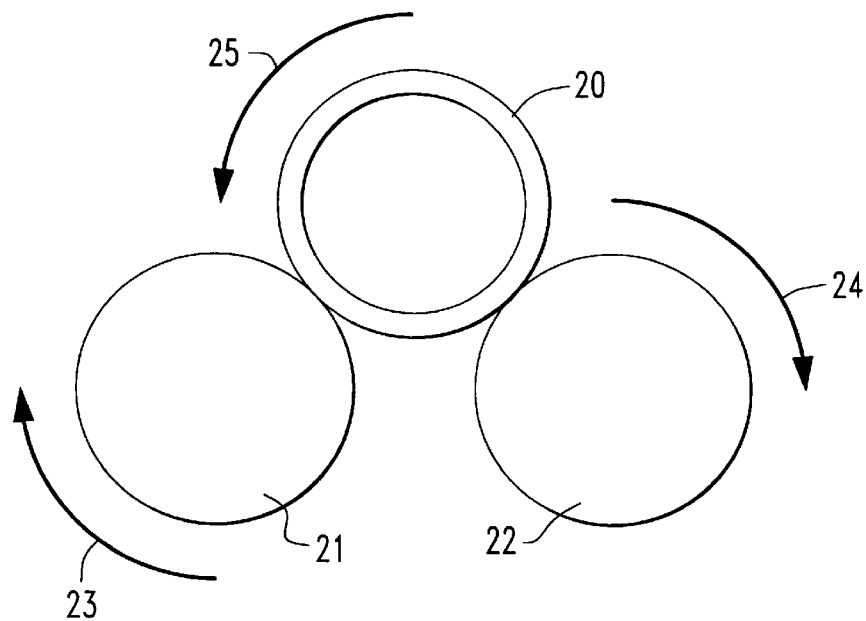
FIG. 3 is a partially schematic end view illustrating a process for drying a fuel cell tube in accordance with an embodiment of the present invention.
Figure 4:
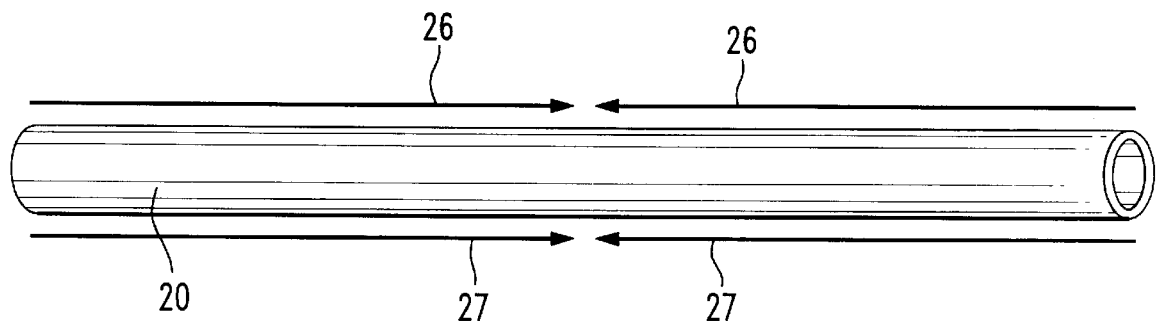
FIG. 4 is an elevational view of a straight dried fuel cell tube produced in accordance with an embodiment of the present invention.

The improved method of fuel cell tube drying of the present invention preferably involves continuously rotating the tube while it dries. An embodiment of this method is schematically illustrated in FIG. 3. The fuel cell tube 20 rests on two rollers 21 and 22. Rotation of the rollers 21 and 22 in the directions shown by the arrows 23 and 24 causes rotation of the fuel cell tube 20 about its axis in the direction shown by the arrow 25. Drying of the fuel cell tube 20 is substantially uniform around the circumference of the tube, and hence the linear shrinkage of the tube is also uniform, as illustrated by the upper arrows 26 and lower arrows 27 shown in FIG. 4. This results in a dried green tube that is straight.

The rollers 21 and 22 may be made of any suitable material such as stainless steel, polyvinyl chloride or nylon. The diameter of each roller 21 and 22 is preferably from about 25 to about 200 percent of the diameter of the fuel cell tube to be dried. An alternative drying configuration would be to support the tube on an air bed and connect the tube itself to a drive mechanism that would provide continuous rotation of the tubes.

In accordance with the method of the present invention, a tube is formed from a mixture comprising ceramic fuel cell powder and a solvent. The mixture is preferably in paste form. The ceramic fuel cell powder may be of any suitable composition for the formation fuel cell components. For example, for an air electrode of the fuel cell, the ceramic fuel cell powder may comprise $La_{1-x}(M1)_xMn_{1-y}(M2)_yO_3$ where M1 is calcium, strontium, yttrium, cerium, other appropriate dopants or combinations thereof, M2 is nickel, chromium, zinc, colbalt, other appropriate dopants or combinations thereof, X is from 0 to about 0.5, and Y is from 0 to about 0.5. The solvent may comprise water, propanol, butyl acetate or butoxyethanol, with water being preferred for many applications. In addition to the ceramic fuel cell powder and solvent, the mixture may include organic binders such as methylcellulose, hydroxyproply methylcellulose, polyvinyl alcohol, polyvinyl butyral resin or acrylic polymer, and/or may include plasticizers such as polyethylene glycol, butylbenzl phthalate or polymeric fatty acids.

The tube may be formed by any suitable method, preferably extrusion. For example, a paste may be made by combining an appropriate mixture of the above-noted compounds and mixing them under conditions of high shear. The tube may then be extruded by forcing the paste through a die at elevated pressure, e.g., 800 to 5,000 psi. The shape of the die determines the cross-sectional geometry of the extruded tube.

The resultant formed tube may be of any desired geometry. Preferably, the formed tube is hollow with an annular cross-section. The hollow tubes may be open at both ends, closed at both ends, or open at one end and closed at the other end.

In accordance with a preferred embodiment, the formed tube is rotated about a substantially horizontal axis. Preferably, the formed tube is rotated at a substantially continuous speed. For example, a set of rollers 21 and 22 as shown in FIG. 3 may be provided onto which the extruded fuel cell tubes are placed and rotated at preferred rate of about 0.1 to 20 rpm, more preferably from about 1 to about 2 rpm.

During rotation of the tube, any suitable surrounding atmosphere may be used. In a preferred embodiment, the surrounding atmosphere is ambient air. Alternatively, gas may be directed against the rotating tubes in order to accelerate their drying. Such forced gas may comprise air or any other suitable gas. The air may be dehumidified if desired.

Typical drying times are less than about 48 hours, preferably less than about 36 hours. More preferably, drying times of from about 16 hours to about 24 hours are used.

The resultant dried fuel cell tubes are substantially straight. For example, the dried fuel cell tube may have an axial bow of less than 0.15 mm per meter, more preferably less than about 0.10 mm per meter. As a particular example, ten recently extruded tubes having a length of 2 m, an inner diameter of 1.95 cm, and an outer diameter of 2.45 cm were dried on a roller system in ambient air for 24 hours at a temperature of about 25° C. The resultant dried tubes all had bows of less than 0.25 mm. This is in contrast with tubes dried using the conventional method shown in FIG. 1, which often had tube bows that were in excess of 2 cm.

After the fuel cell tubes are dried, they may optionally be sintered at a typical temperature of from about 1,500 to about 1,600° C. Preferably, the dried tubes are sintered in a horizontal orientation. The horizontal fuel cell tubes may optionally be rotated during the sintering process.

The present invention possesses several advantages over prior art. For example, it produces air electrode tubes that have superior straightness, and which are compatible with one-step horizontal sintering. The present method eliminates the need for a controlled relative humidity/temperature chamber, which is quite costly and large in a high volume air electrode manufacturing facility. The invention also controls the drying uniformity of the tubes without the requirement of controlling the drying rate. As a result, for example, as opposed to drying over a 48 hour period in a humidity/temperature chamber, the tubes may be completely dried within a 24 hour period in ambient air. It is also possible to accelerate drying by passing air over the tubes while they dry without adversely affecting their straightness.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of drying a fuel cell tube consisting essentially of:
   forming a tube from a mixture comprising ceramic fuel cell powder and solvent; and
   rotating the formed tube substantially about an axis of the tube to at least partially remove the solvent from the formed tube to thereby produce a dried unsintered fuel cell tube.

2. The method of claim 1, wherein the tube is formed by extruding the mixture.

3. The method of claim 1, wherein the formed tube includes an open end and a closed end.

4. The method of claim 1, wherein the ceramic fuel cell powder comprises $La_{1-X}(M1)_X Mn_{1-Y}(M2)_Y O_3$ where M1 is calcium, strontium, yttrium, cerium, other appropriate dopants or combinations thereof, M2 is nickel, chromium, zinc, colbalt, other appropriate dopants or combinations thereof, X is from 0 to about 0.5, and Y is from 0 to about 0.5.

5. The method of claim 1, wherein the solvent comprises water, propanol, butyl acetate, butoxyethanol or a combination thereof.

6. The method of claim 1, wherein the solvent comprises water.

7. The method of claim 6, wherein substantially all of the water is removed from the formed tube.

8. The method on claim 1, wherein the mixture further comprises at least one organic binder selected from the group consisting of methylcellulose, hydroxyproply methylcellulose, polyvinyl alcohol, polyvinyl butyral resin or acrylic polymer.

9. The method on claim 1, wherein the mixture further comprises at least one plasticizer selected from the group consisting of polyethylene glycol, butylbenzl phthalate or polymeric fatty acids.

10. The method of claim 1, further comprising rotating the formed tube about a substantially horizontal axis.

11. The method of claim 1, further comprising rotating the formed tube continuously.

12. The method of claim 11, further comprising rotating the formed tube at a speed of from about 0.1 to about 20 rpm.

13. The method of claim 1, further comprising rotating the formed tube on two opposing rollers.

14. The method of claim 1, wherein each opposing roller has a diameter of from about 25 to about 200 percent of an outer diameter of the formed tube.

15. The method of claim 1, further comprising rotating the formed tube in ambient air.

16. The method of claim 1, further comprising directing gas against the rotating formed tube to accelerate the drying thereof.

17. The method of claim 16, wherein the gas is air.

18. The method of claim 17, wherein the air is dehumidified.

19. The method of claim 1, wherein the dried fuel cell tube is substantially straight.

20. The method of claim 19, wherein the dried fuel cell tube has an axial bow of less than about 0.15 mm per meter.

21. The method of claim 1, further comprising sintering the dried fuel cell tube.

22. The method of claim 21, further comprising rotating the formed tube about a substantially horizontal axis and sintering the dried fuel cell tube about the substantially horizontal axis.

23. The method of claim 1, where the fuel cell tube is an air electrode of a solid oxide fuel cell.

24. The method of claim 1, wherein the step of rotating the formed tube is performed on rollers, and further comprising the step of removing the dried unsintered fuel cell tube from the rollers.

25. The method of claim 1, wherein the formed tube has a maximum outer diameter of 2.45 cm.

26. The method of claim 1, wherein the formed tube has a maximum thickness of about 0.5 cm.

* * * * *